United States Patent
Mallya et al.

(10) Patent No.: US 9,727,450 B2
(45) Date of Patent: Aug. 8, 2017

(54) MODEL-BASED SOFTWARE APPLICATION TESTING

(71) Applicant: Syntel, Inc., Troy, MI (US)

(72) Inventors: Srinath M. Mallya, Chennai (IN); Padmanabhan Balasubramanian, Chennai (IN); Prasanth Kiran Malla, Tamil Nadu (IN)

(73) Assignee: Syntel, Inc., Troy, MI (US)

( * ) Notice: Subject to any disclaimer, the term of this patent is extended or adjusted under 35 U.S.C. 154(b) by 146 days.

(21) Appl. No.: 14/671,073

(22) Filed: Mar. 27, 2015

(65) Prior Publication Data

US 2016/0283358 A1    Sep. 29, 2016

(51) Int. Cl.
*G06F 11/00* (2006.01)
*G06F 11/36* (2006.01)

(52) U.S. Cl.
CPC ........ *G06F 11/3684* (2013.01); *G06F 11/362* (2013.01); *G06F 11/3608* (2013.01); *G06F 11/3688* (2013.01)

(58) Field of Classification Search
CPC .. G06F 11/3684; G06F 11/3688; G06F 11/36; G06F 11/3608; G06F 11/362; G06F 11/3672; G06F 11/3676; G06F 11/368
USPC .................... 714/38.1, 25, 26, 33, 32, 38.14
See application file for complete search history.

(56) References Cited

U.S. PATENT DOCUMENTS

| | | | |
|---|---|---|---|
| 5,146,460 A | 9/1992 | Ackerman et al. | |
| 5,513,315 A | 4/1996 | Tierney et al. | |
| 7,392,149 B2 | 6/2008 | Bonilla | |
| 7,721,261 B2 | 5/2010 | Schultz et al. | |
| 7,747,987 B1 | 6/2010 | Akarte et al. | |
| 7,797,680 B2* | 9/2010 | Haas | G06F 11/3688 714/38.1 |
| 8,001,468 B2 | 8/2011 | Khaladkar et al. | |
| 8,141,043 B2* | 3/2012 | Jones | G06F 11/3688 714/38.1 |
| 8,161,459 B2 | 4/2012 | Gorthi et al. | |
| 8,271,949 B2 | 9/2012 | Bernardini et al. | |
| 8,510,602 B2 | 8/2013 | Chen | |
| 8,566,777 B2 | 10/2013 | Chaar et al. | |

(Continued)

OTHER PUBLICATIONS

"Object Management Group Business Process Model and Notation." Object Management Group, Inc. Copyright 1997-2014. Web. Aug. 13, 2014.

(Continued)

*Primary Examiner* — Joseph D Manoskey
(74) *Attorney, Agent, or Firm* — Dykema Gossett PLLC (57) ABSTRACT

A method of testing a software application may include receiving a business process model of a software application, the business process model comprising representations of elements of the software application and labels for the elements of the software application. The method may further include generating a plurality of test cases according to the business process model, each test case comprising respective links between one or items of test data and the labels for the elements of the software application, and executing the test cases to test the software application. The method may further include prioritizing and generating pre-conditions for test cases. The method may be embodied in an article of manufacture, such as a non-transitory computer-readable medium storing instructions.

20 Claims, 4 Drawing Sheets

(56) References Cited

U.S. PATENT DOCUMENTS

| | | | |
|---|---|---|---|
| 8,850,407 B2* | 9/2014 | Hemed | G06F 11/3684 717/131 |
| 2003/0069869 A1 | 4/2003 | Gronau et al. | |
| 2003/0093310 A1 | 5/2003 | Macrae | |
| 2004/0143819 A1 | 7/2004 | Cheng et al. | |
| 2004/0181775 A1* | 9/2004 | Anonsen | G06Q 10/10 717/104 |
| 2006/0053039 A1 | 3/2006 | Gamarnik et al. | |
| 2006/0085681 A1* | 4/2006 | Feldstein | G06F 11/3684 714/25 |
| 2006/0129440 A1 | 6/2006 | Frauenhoffer et al. | |
| 2007/0083421 A1 | 4/2007 | McNair et al. | |
| 2009/0007078 A1 | 1/2009 | Hoyek et al. | |
| 2009/0177510 A1 | 7/2009 | Marsh | |
| 2009/0192761 A1 | 7/2009 | Pearl | |
| 2009/0319313 A1 | 12/2009 | Subash et al. | |
| 2012/0296687 A1 | 11/2012 | Satyanarayana et al. | |
| 2014/0032637 A1 | 1/2014 | Weir | |
| 2014/0130014 A1 | 5/2014 | Jensen et al. | |
| 2014/0165043 A1 | 6/2014 | Pasala et al. | |
| 2014/0195284 A1 | 7/2014 | Purandare et al. | |
| 2015/0178182 A1 | 6/2015 | Mallya | |

OTHER PUBLICATIONS

"Gateway." Object Management Group Business Process Model and Notation. Object Management Group, Inc. Copyright 1997-2014. Web. Aug. 13, 2014.
"QA Products and Testing Tools." Cognizant Technology Solutions. Copyright 2014. Web. Aug. 12, 2014.
"IBM Business Process Manager." IBM. Web. Aug. 12, 2014.
"Service Offerings Infosys Functional Test Case Generator." Infosys Limited. Copyright 2014. Web.
"Infosys Functional Test Case Generator." Bangalore, India: Infosys Technologies Limited, 2011.
"ARIS 9.6." Software AG. Copyright 2014. Web. Aug. 12, 2014.
"JIRA." Web. May 5, 2012.
"JIRA." Web. May 13, 2012.
"JIRA." Wikipedia. Web. Dec. 29, 2012.
"Rally Software." Web. Mar. 26, 2013.
"HP QuickTest Professional." Wikipedia. Web. Sep. 3, 2013.
"Selenium (software)." Wikipedia. Web. Dec. 7, 2013.
"Eclipse." Web. Feb. 14, 2014.
"HP Quality Center Enterprise software." Web. Mar. 20, 2015.
Accenture, Accenture Claim Components, Achieving High Performance in Claims, (Dec. 2011, 8 pgs.).
Guidewire Software, Inc., "Rating with PolicyCenter 7.0" (Sep. 26, 2011, 2 pgs.).
Duck Creek Technologies, "Property and Casualty—Policy Administration", (Aug. 17, 2011, 2 pgs.).
Duck Creek Technologies, "Insurance Solutions for Property and Casualty", (Jul. 19, 2011, 2 pgs.).
Duck Creek Technologies, "Property and Casualty—Rating and Rules", (Aug. 20, 2011, 2 pgs.).
Duck Creek Technologies, Presentation, (Jun. 24, 2009, 6 pgs.).
Duck Creek Technologies, Example Author, (May 29, 2012, 6 pgs.).
Duck Creek Technologies, "Property and Casualty—Billing, Policy Administration" (Sep. 30, 2011, 2 pgs.).
Duck Creek Technologies, "Accenture Claim Components" (Sep. 30, 2011, 2 pgs.).
Duck Creek Technologies, "Example Author" (Sep. 30, 2011, 2 pgs.).
Duck Creek Technologies, "Example Express" (Sep. 30, 2011, 2 pgs.).
Duck Creek Technologies, "Example Forms" (Sep. 30, 2011, 2 pgs.).
Duck Creek Technologies, "Example Platform" (Jul. 19, 2011, 2 pgs.).
Duck Creek Technologies, "Example Server" (Jul. 19, 2011, 2 pgs.).
Duck Creek Technologies, "Templates for Commercial Lines" (Sep. 30, 2011, 2 pgs.).
Duck Creek Technologies, "Example TransACT" (Sep. 30, 2011, 2 pgs.).
FireScope Unify, "Manage What Matters Now" (Feb. 2, 2011, 4 pgs.).
Capgemini Consulting Technology Outsourcing, "Testing for Guidewire ClaimCenter" (Jul. 7, 2010, 4 pgs.).
Guidewire Updates ClaimCenter System (Nov. 14, 2006, 4 pgs.).
Guidewire Software Announces Releases of Guidewire ClaimCenter 2.0, End-to-End, Web-Based Claims System Offers Enhanced Transaction and Integration Capabilities (Nov. 25, 2003, 3 pgs.).
Business Wire, "Real-Time Claims Performance Monitoring Leads Rich Set of New Capabilities in Latest Version of Market-Leading P&C Claims System" (Jan. 27, 2010, 3 pgs.).
Guidewire Unveils Newest Version of Its Policy Admin System (Apr. 28, 2011, 2 pgs.).
HCL Completes Guidewire ClaimCenter Deployment for New Jersey Manufacturers Insurance Company (Aug. 21, 2008, 3 pgs.).
CSC Experience Results, "Vantage-One Annuities" (Jul. 6, 2007, 4 pgs.).
Oracle, Oracle Buys AdminServer, Expands Oracle's Applications Drive into Insurance, (May 13, 2008, 16 pgs.).

* cited by examiner

MODEL-BASED SOFTWARE APPLICATION TESTING

BACKGROUND a. Technical Field

The present disclosure relates to software application testing, including the generation and execution of test cases for testing a software application.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

An important task in the introduction or modification of a software-based system is testing and quality control of the features of the system. In known systems, testing is generally performed in a fully manual or semi-automated fashion. In fully manual testing, a tester may manually input a series of manually-derived actions for testing the functionality of the system (one or more of which actions may be included in a test case) and manually record the outcome. In semi-automated testing, one or more aspects of the testing process may be automated.

Both manual and semi-automatic testing have numerous drawbacks. First, both require a significant amount of manual intervention to generate and/or execute test cases. The burden of this manual activity can be significant— manual generation of test cases can consume hundreds of man-hours or more. Furthermore, as software systems become increasingly complex, the time required for manual test generation continues to increase. Second, test cases are generally applied against a model or replica of the system, rather than the system itself. As a result, the accuracy of the test results depend on the accuracy of the replica, which may not be a perfect replica and thus may return different results than the system itself. Third, test case generation and execution are generally implemented by different programs, entities, etc., further increasing the time required for and complexity involved with testing.

There is, therefore, a need for solutions that minimize or eliminate one or more of the above-described shortcomings. The foregoing discussion is intended only to illustrate the present field and should not be taken as a disavowal of claim scope.

SUMMARY

An exemplary embodiment of an article of manufacture may store computer-readable instructions for testing a software application. The computer-readable instructions may include receiving a business process model of a software application, the business process model comprising representations of elements of the software application and labels for the elements of the software application. The instructions may further include generating a plurality of test cases according to the business process model, each test case comprising respective links between one or items of test data and the labels for the elements of the software application, and executing the test cases to test the software application.

An exemplary embodiment of a method for testing a software application may include receiving a business process model of a software application, the business process model comprising representations of elements of the software application and labels for the elements of the software application. The method may further include generating a plurality of test cases according to the business process model, each test case comprising respective links between one or items of test data and the labels for the elements of the software application, and executing the test cases to test the software application.

An exemplary embodiment of an article of manufacture may store computer-readable instructions for testing a software application. The instructions may include receiving a business process model of a software application, the business process model comprising representations of a plurality of elements of the software application and labels associated with each of those elements. The instructions may further include determining a plurality of unique paths through the business process model, each path comprising a sequence of one or more of the elements of the software application, generating at least one test case for each of the plurality of paths through the business process model, each test case comprising a test action for each element in the path of the test case, and creating at least one computer-executable script embodying the test cases.

The foregoing and other aspects, features, details, utilities, and advantages of the present disclosure will be apparent from reading the following description and claims, and from reviewing the accompanying drawings.

DETAILED DESCRIPTION

Figure 1:
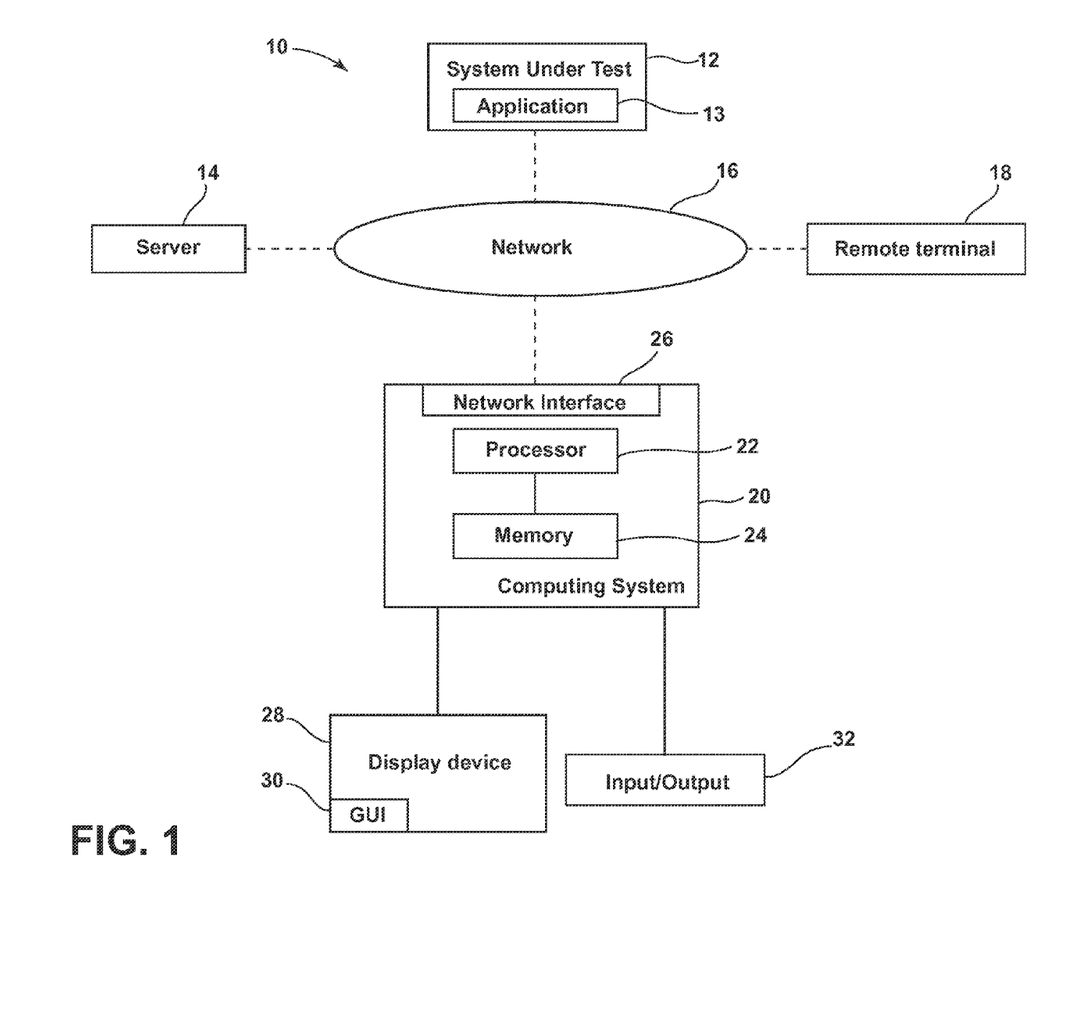
FIG. 1 is a block diagram view of an exemplary embodiment of a computer application testing system.

Referring to the drawings, wherein like reference numerals indicate the same or similar components in the various views, FIG. 1 is a block diagram view of an exemplary embodiment of a computer application testing system 10. The testing system 10 may include a system under test 12 containing an application to be tested 13, a server 14, a network 16, a remote terminal 18, and a computing system 20.

The computing system 20 may include an electronic processor 22, a non-transitory computer-readable memory 24, a variety of input/output mechanisms such as a network interface 26 and a display device 28. The display device 28 may be configured to display various interface elements as part of a graphic user interface (GUI) 30 to provide access to various functional modules. For example, the GUI may provide access to the functional modules illustrated in and described with respect to FIG. 2, in an embodiment. The computing system 20 may also include other I/O mechanisms 32 such as a touchscreen, a microphone, a speaker, a camera, a keyboard and a user selection device like a pointing device (e.g., a mouse or a trackpad).

With continued reference to FIG. 1, the computing system 20 may be configured to perform one or more tasks, steps, and/or methods described in this disclosure. For example, in an embodiment, tasks, steps, and/or methods described in this disclosure may be stored in the memory 24 in the form of instructions (e.g., one or more computer programs) that, when executed by the processor 22, cause the processor to perform the tasks, steps, and/or methods. For example, the memory 24 may store, and the processor 22 may execute, one or more methods for testing a computer application disclosed herein, and/or portions or steps of one or more such methods.

The processor 22 may be configured generally to control the overall operation of the computing system 20, which may include controlling the memory 24 and the display device 28. In embodiments, the processor 22 may include one or more programmable processors, microprocessors, and/or microcontrollers. In addition, the processor 22 may include a central processing unit (CPU), memory (in addition to or such as the illustrated memory) and an input/output (I/O) interface through which the processor 22 may receive a plurality of input signals including signals generated via the graphical user interface (GUI) 30 and/or other input/output devices 32. Such an I/O interface may also be configured to generate a plurality of output signals including those used to control and/or provide data to the display device 28 (e.g., to provide the GUI 30).

The memory 24 may be an article of manufacture provided for storage of data, instructions, and/or code and is configured for communication with, or in communication with, at least the processor 22. The memory 24 may include various forms of non-volatile memory including flash memory, read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that the memory 24 may be internal to the processor 22, in an embodiment.

The display device 28 may be configured to display aspects of the GUI 30. The display device 28 may function as an input/output device, as noted above, for the user of computing system. The display device 28 may be, for example only, a liquid crystal display or light emitting diode display or other display technology. The display device 28 may function as only an output device with input received through other I/O devices 32. Alternatively, the display device 28 may also function as an input device and may include a touch screen display including, for example, capacitive and/or resistive touch screen displays, and/or other technologies.

The computing system 20 may be optionally connected to the network 16 by way of the network interface 26. The network 16 may include, for example, an intranet (e.g., a LAN), the internet, a cellular network, and/or other networks. The network interface 26 may permit services or programs of the computing system 20 to be provided in a client-server model. For example only, such a client-server model may involve deployment of the server 14 in communication with computing system 20. Accordingly, the computing system 20 may be used to execute a method for testing the system under test 12, or portions of such a method, by storing that method locally (i.e., in the memory 24), or by accessing that method through the server 14 (i.e., in a server-client relationship).

The system under test 12 may comprise a computer system, in an embodiment, having many of the same or similar components as the computing system 20. An application to-be-tested 13 (which may be referred to simply as "the application" 13) may be installed on the system under test 12. The system under test 12 may be accessible by the computing system 20 over the network 16. In an embodiment, the system under test 12 may be in communication with the server 14, and the application 13 may be accessible over the Internet. For example, the application 13 may be accessible or implemented through a website, in an embodiment.

The computing system 20 may be configured to perform one or tasks, steps, or methods involved in testing the application 13, in an embodiment. For example, the computing system 20 may be configured to: create or enable the creation of a model of the application, store the model, create, enable the creation of, or receive test data, store test data, associate test data with element labels in the model, generate or enable the generation of test cases having associated test data and element labels, store such test cases, export such test cases, access the application to be tested 13 (e.g., by connecting to the system under test 12 over the network 16), execute test cases on the application 13, store test case execution results, and/or export test case execution results.

Figure 2:
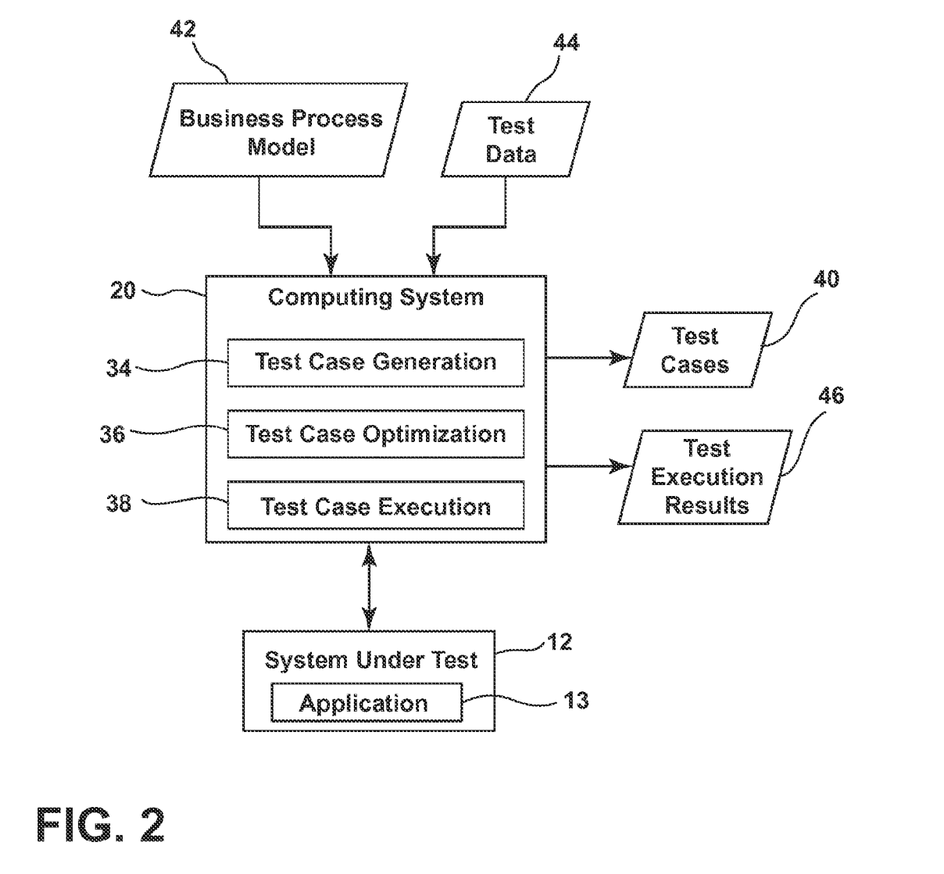
FIG. 2 is a partial block diagram and partial flow chart illustrating exemplary functionality of portions of the computer application testing system of FIG. 1.

FIG. 2 is a block diagram and flow chart illustrating the functionality of a portion of the system 10. Namely, FIG. 2 illustrates exemplary functional modules that may be installed on the computer system 20 of FIG. 1 (i.e., stored in the memory 24 as instructions for execution by the processor 22). Referring to FIG. 2, the computer system 20 may include a test case generation module 34, a test case optimization module 36, and a test case execution module 38, in an embodiment.

The functional modules 34, 36, 38, and other functionality described herein, may be implemented through any appropriate programming language or package. For example, in an embodiment, some or all of the functionality of the functional modules may be built on .NET technology available from Microsoft, Inc. of Redmond, Wash. The functional modules 34, 36, 38 may be implemented in a single program (i.e., a single executable), in an embodiment.

The test case generation module 34 may be configured to generate test cases 40 for testing the application. The test case generation module 34 may be configured to receive a business process model 42 that models the functionality and business requirements of the application. The business process model 42 may be composed in business process model notation (BPMN), in an embodiment. The business process model 42 may be stored as an .xml file or another appropriate file type, in an embodiment. The business process model 42 may be composed by an owner or operator of the application, in an embodiment. The business process model 42 may include element labels that correspond to actual elements in the application, in an embodiment. For example, if the application includes a home screen with a login portion having a username entry and a password entry, the business process model 42 may include labels that indicate a username entry element and a password entry element for the relevant model elements. Further interface elements may include, for example and without limitation, a radio button, another button, a hyperlink, another text entry field, and so on. In the case of a text entry field, a label adjacent the field in the application may be used as the element label in the model. The labels enable run-time mapping of objects (elements of the application 13) with test actions. With this feature, seamless automated test case generation and execution is possible with the BPMN model as input.

As noted above, a business process model 42 may be defined in BPMN. A model defined in BPMN may have a number of elements, in an embodiment, that are representations of elements in the application. Elements of a BPMN model may include, for example: flow objects, such as events, activities, and gateways; connecting objects, such as sequence flow, message flow, and association; swim lanes; and artifacts, such as data objects, groups, and annotation. Any of these elements may be associated with a label in the model.

To generate test cases 40, the test case generation module 34 may be further configured to receive test data 44. The test data 44 may include a set of possible inputs to the objects in the model (i.e., corresponding to actions to be performed on the application to be tested). The test data 44 may be stored as one or more spreadsheets, such as Microsoft Excel files, or another appropriate file type, in an embodiment. The test data 44 may be compiled by the owner or operator of the application, in an embodiment. Alternatively, the test data may be compiled by the owner or operator of the computing system 20, in an embodiment. Alternatively, the test case generation module 34 may be configured to automatically generate test data, in an embodiment.

The test case generation module 34 may be configured to generate test cases 40 by crawling the business process model 42, in an embodiment, to determine every possible functional flow path in the business process model 42. The flow paths may be stored in a data file, in an embodiment, such as a spreadsheet. The test case generation module 34 may generate one or more respective test cases 40 for each respective functional flow path, in an embodiment. Each test case 40 may include a sequence of actions on the application, in addition to the expected outcome of each of those actions.

In building test cases 40, the test case generation module 34 may be configured to associate flow paths with data corresponding to elements in those flow paths (or, stated another way, to associate element labels from the business process model 42 with applicable test data 44). Thus, for each test case, element labels may be associated with data to be input to elements in the application to be tested corresponding to those labels. Thus, for each action in a test case, an element label associated with that action may be derived from (and, thus, link the action to) the element on which the associated data is to be input. This association of element labels with test data in the test cases enables automated execution of test cases 40, as will be described later.

In an embodiment, the test case generation module 34 may be configured to update or alter a set of test cases 40 based on an updated model. Accordingly, the test case generation module 34 may be configured to compare a business process model 42 with a previous, or otherwise different, version of a business process model 42 to determine the differences between the two models. The test case generation module 34 may be further configured to eliminate previously-generated test cases 40 affected by the differences, and to generate new test cases 40 that account for the differences. Thus, updating test cases 40 for an updated or different model may not require determining or crawling every flow path in the updated or different model.

The test case optimization module 36 may be configured to optimize a set of test cases 40 to reduce the amount of testing needed to completely test an application. In an embodiment, the test case optimization module 36 may be configured to perform a pairwise comparison procedure to reduce the number of test cases 40 to a smaller number of test cases. In an embodiment, the number of test cases 40 remaining after the pairwise comparison may still exhaustively test the application. For example, the test cases 40 remaining after the pairwise comparison may include every possible pairing of two inputs, but may not include every possible sequence of inputs, in an embodiment.

The test cases optimization module 36 may be configured to optimize the test cases 40 at one or both of two levels, in an embodiment. At a first level, the test case optimization module may be configured to optimize the number of flow paths that are used to represent the application functionality. At a second level, the test case optimization module may be configured to optimize the test data 44 by reducing the number of combinations of test data that are applied in any given flow path. The test case optimization module 36 may be further configured to provide a user of the computer system 20 with the option to apply test case optimization at one or both levels.

The test case execution module 38 may be configured to execute test cases 40 on the application. In an embodiment, the test case execution module 38 may be configured to receive a set of generated test cases 40 (e.g., test cases 40 generated by the test cases generation module 34) and execute those test cases 40. In an embodiment, the test case execution module 38 may be configured to execute the test cases 40 on the actual application 13, on the actual system-under-test 12.

To execute the test cases 40 on the application 13, the test case execution module 38 may be configured to connect to the system-under-test 12 over a network. For example, in an embodiment in which the application 13 is implemented on or otherwise accessible through a website, the test case execution module 38 may be configured to access the website and to execute test cases 40 by interacting with the website. In such an embodiment, the test case execution module 38 may execute one or more scripts to identify elements in the application 13 (i.e., through the website interface) according to the element labels in the test cases 40 and to input the test data 44 associated with those elements. In an embodiment, the test case execution model 38 may initiate a script (e.g., a Java script) to access the website interface and/or enter test data 44.

The test case execution module 38 may be further configured to compare the outcome of each test case 40, and/or each action within a test case 40, to an expected outcome, and to record each test case and/or action as successful, passed, and the like, or as failed, erroneous, and the like. The test case execution module 38 may be further configured to record and tabulate the outcome of each executed test cases, and to export the test execution results 46 for viewing by, for example, the owner or operator of the application 13.

In addition to, or as an alternative to, executing the generated test cases 40, the computing system 20 may be configured to export the test cases 40 for execution by a separate test execution program, or for manual execution. The computing system 20 may be configured to export the test cases 40 in the form of a spreadsheet, such as a Microsoft Excel file, for example, or another appropriate file type. The test cases 40 may be configured for management and use by an external test case management tool such as, for example, JIRA (commercially available from Atlassian Pty Ltd of Sydney, Australia), test management software commercially available from Rally Software Development Corp. of Boulder, Colo., or Quality Center (commercially available from Hewlett-Packard Development Company, L.P.).

Figure 3:
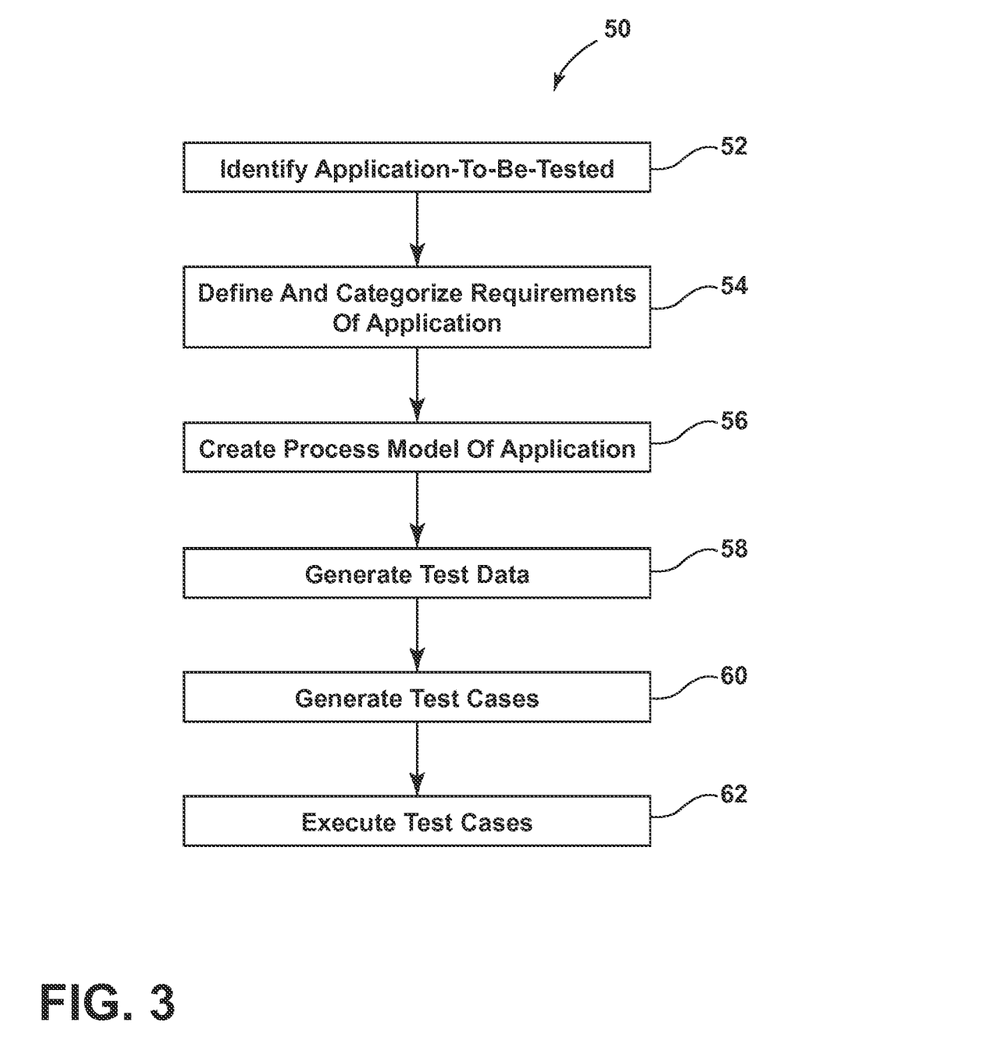
FIG. 3 is a flow chart illustrating an exemplary embodiment of a generic method of testing a computer application.
Figure 4:
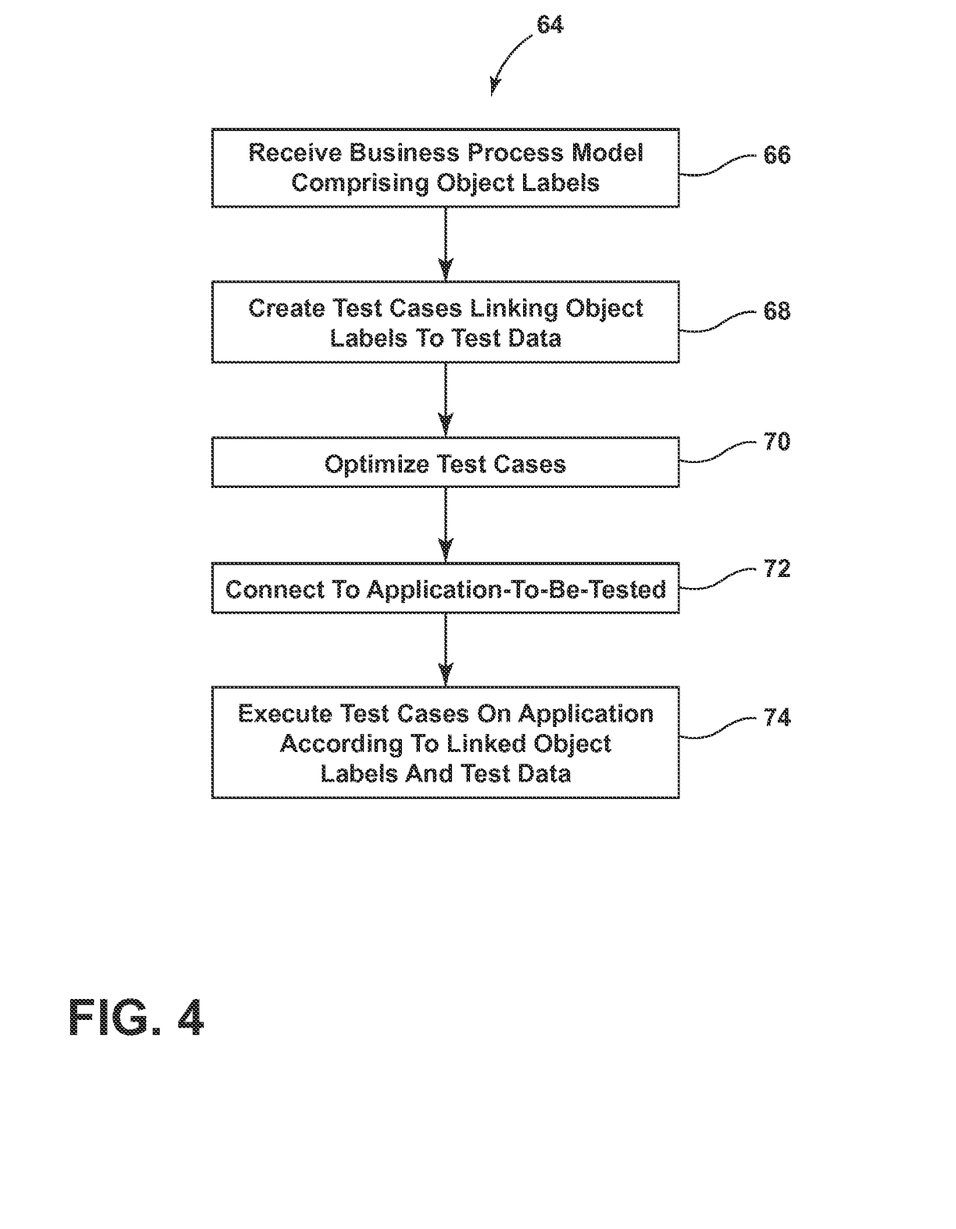
FIG. 4 is a flow chart illustrating an exemplary embodiment of a method of automatically testing a computer application.

As generally summarized above, the computing system 20 may be configured to perform one or more steps in a method of testing a computer application 13. FIGS. 3 and 4 are flow charts of exemplary embodiments of methods of testing a computer application. The computing system 20 may be configured to perform one or more steps of the methods. For example, in an embodiment, one or more steps of the methods may be stored as instructions in a memory of the computer system 20 (i.e., the memory 24 illustrated in FIG. 1) that, when executed by a processor of the computer system 20 (i.e., the processor 22 illustrated in FIG. 1), cause the processor to perform the steps. Alternatively, referring to FIG. 1, one or more steps of the methods may be performed by the computing system 20, in conjunction with the server 14, by the computing system 20 accessing the server 14.

FIG. 3 is a flow chart illustrating an exemplary embodiment of a generic method 50 of testing a computer application. The method 50 may begin with a step 52 that includes identifying the application to-be-tested. Identifying the application may include identifying the application underlying the functionality for which testing is desired and gaining an understanding of the application (e.g., through the examination of application documentation). The owner or operator of the application may perform the identifying step 52, in an embodiment. Additionally or alternatively, an entity tasked with testing the application may perform the identifying step.

The method 50 may further include a step 54 that includes defining and categorizing the requirements of the application. In an embodiment, the defining and categorizing step 54 may include defining the process flows of the application and categorizing the features of the application in terms of requirements and sub-requirements (e.g., required input type, required sequence of input, etc.). The owner or operator of the application may perform the defining and categorizing step, in an embodiment. Additionally or alternatively, an entity tasked with testing the application may perform the defining and categorizing step 54.

The method 50 may further include a step 56 that includes creating a process model of the application. The process model may be defined in, for example, Business Process Modeling Notation (BPMN). The process model may be produced using a business process modeling application such as, for example, the Model Development Tools available from The Eclipse Foundation of Ottawa, Ontario, Canada.

The method 50 may further include a step 58 that includes generating test data. The generating test data step 58 may include identifying the dynamic and static data used by the application, generating possible values for that data, and validating the generated values. The test data may be stored in a spreadsheet or another file type, in an embodiment.

The method 50 may further include a step 60 that includes generating test cases. Test cases may be created so as to test a plurality of possible sequences of inputs and events for the application. In embodiment, generating test cases 60 may include generating a set of test cases that exhaustively tests the possible sequences of inputs and events for the application. In an embodiment, the test cases may be generated by crawling the business process model to account for every possible flow path. The test cases may be stored in .xml form, in an embodiment.

The method 50 may further include a step 62 that includes executing the test cases. In many known systems, execution of test cases may be performed by a separate program, entity, etc. than the step of generating the test cases. In such known systems, a user must perform separate processes of generating test cases with an appropriate program, then storing and exporting the results to a separate program, with a separate interface, and initiating a separate execution process. In many known systems, executing test cases involves manually inputting the test data to test the application. Accordingly, test execution may be cumbersome and time-intensive in such known systems.

FIG. 4 is a flow chart illustrating an exemplary embodiment of a method 64 of testing an application. Referring to FIGS. 1 and 4, one or more steps of the method 64 may be performed by the computing system 20 to test the application 13 on the system-under-test 12. That is, one or more steps of the method 64 may be stored in the memory 24 as instructions that, when executed by the processor 22, cause the processor 22 to perform the one or more steps. In an embodiment, each step of the method 64 may be performed by the computing system 20. Referring to FIGS. 2 and 4, one or more steps of the method 64 may be embodied in the test case generation module 34, the test case optimization module 36, and/or the test case execution module 38.

The method 64 may begin with a step 66 that includes receiving a business process object model comprising element labels. The model may be composed in business process model notation (BPMN), in an embodiment, or another appropriate modeling language, scheme, or depiction means. The element labels may be associated with elements in the business process model corresponding to actual interface elements of the application that is modeled by the business process model. The labels may thus be used to retrieve the object properties of associated interface elements of the application. The retrieved object properties may be used to automatically execute test cases, as described with respect to step 74 below.

The business process model may be received by virtue of being imported, loaded, etc. by the computing system from another system, or by a user, in an embodiment. That is, the business process model may be composed by a system other than the computing system, in an embodiment. In another embodiment, referring to FIG. 2, the business process model 42 may be composed by or stored on the computing system 20 and may be received by a module, such as the test case generation module 34.

Referring again to FIG. 4, the method 64 may further include a step 68 that includes creating (that is, generating) test cases that include linked element labels and test data. In an embodiment, the test cases may be created according to the received business process model. For example, the business process model may be crawled so that each and every possible path through the model is covered by a test case.

The step 68 of creating test cases may involve creating multiple data sets, in an embodiment. For example, a first data set may comprise each possible path through the business process model. The first data set may include element labels for elements of the model. Accordingly, the first data set may comprise a plurality of sequences of element labels. The first data set may further include exception handling statements and wait statements, as desired, in one or more flow paths.

A second data set may comprise a set of actions, or a plurality of sets of actions, in an embodiment. The set of actions may be related to the elements of the business process model, in an embodiment, such that the second data set includes one or more actions for one or more elements in the business process model. In an embodiment, the second data set may include one or more actions for each artifact in the business process model. In a further embodiment, the second data set may include an exhaustive set of actions for each artifact in the business process model. Thus, for example, if the application that is modeled by the business process model includes, among other things, a password entry portion and a username entry portion, the second data set may include as many options as are needed to exhaustively test both the username and the password entry (e.g., at least one valid and at least one invalid input for both).

In an embodiment, the second data set may also store element labels corresponding to the application elements to which the stored actions also correspond. Accordingly, the second data set may include a linkage between test data (i.e., in the form of actions) and element labels. The second data set may also include expected outcomes of inputting the test data into the application to be tested, in an embodiment.

The creating test cases step 68 may further include associating each possible path through the business process model, as stored in the first data set, with one or more actions for each element in the path, as stored in the second data set, resulting in at least one test case for each possible path. In an embodiment, each possible path through the business process model, as stored in the first data set, may be associated with each possible combination of actions, as stored in the data set, resulting in an exhaustive set of test cases, each having element labels associated with the applicable test data. The creating test cases step 68 may further include generating priority and pre-conditions for all possible paths through the business process model, in an embodiment.

Each test case may be embodies in a script, in an embodiment. Accordingly, a plurality of scripts may be stored for later execution against the system, each script comprising a unique test case. That is, each script may include code for applying the data of a test case according to the object labels of the test case against the system under test, as set forth later in the method. The scripts may be created based on the first and second data sets, as described above. In an alternate embodiment, all test cases may be embodied in a single script.

As described above, each test case may include, in an embodiment, test data that is associated with one or more element labels that correspond to respective application elements. For example, if the application to be tested includes a username entry element (i.e., field) and a password entry element (i.e., field), each test case that includes the model representation of the username entry element may include the data to be entered in the username entry field associated with the label for the username entry field. The label may correspond to the name for the relevant field in the code underlying the application.

The method 64 may further include a step 70 that includes optimizing the set of test cases. The optimization step 70 may include applying a pairwise optimization technique, in an embodiment. The pairwise optimization technique may be applied to one or both of the possible paths through the business process model and the set or sets of test actions. As a result of the optimizing step 70, the number of test cases may be reduced to more efficiently test the application. The optimizing step 70 may be performed before generating test cases, in an embodiment (i.e., may be performed on the first and/or second data sets referenced above before combining the data sets into test cases), or may be performed after test cases are generated.

The method 64 may further include a step 72 that includes connecting to the application to-be-tested. For example, referring to FIG. 1, connecting may include establishing a direct connection between the computing system and the system under test. Alternatively, connecting may include an intranet connection between the computing system and the system under test, or an internet connection between the computing system and the system under test.

In an embodiment, connecting to the application 72 may be performed by prompting a user to enter connection information, receiving the connection information from the user, and connecting to the system under test according to the connection information. For example, in an embodiment in which the application is accessible through a web page, connecting to the application may include prompting the user to enter a URL, receiving a URL from the user, and connecting to the URL entered by the user (e.g., by opening a web browser and connecting to the URL with the browser). In an embodiment, a script may be run that prompts the user for connection information and automatically performs all remaining tasks required to connect to the application.

The method 64 may further include a step 74 that includes executing the test cases on the application according to the linked element labels and test data. In an embodiment, the executing step 74 may include iteratively proceeding through the set of test cases, executing each test case against the actual application to be tested. In an embodiment, the test cases may be executed by executing one or more scripts embodying the test cases (i.e., where the scripts include test actions associated with element labels). In such an embodiment, a script may identify objects/elements in the application (i.e., through a website interface) according to the element labels in the test cases and to input the test data associated with those elements. In an embodiment, the test case execution step 74 may include initiating a script (e.g., a Java script) to access the website interface and/or enter test data. Still further, in an embodiment, the element labels may be used to build one or more dynamic queries (e.g., one or more xpaths, in an embodiment in which the test cases comprise an XML file or XML aspects) to perform the test actions associated with one or more objects.

Executing an individual test case may include finding the element in the application that corresponds to the first test action in the test case, inputting the first test action, and recording the outcome. Finding the element that corresponds to the first test action may include matching an element label associated with the first test action with an element in the interface of the application. For example, where the application is a website or is accessible through a website, the element label may be compared to the HTML code for the webpage. Execution of the test case may then proceed to the second test action in the test case, then the third, and so on.

Executing test cases may further include comparing the outcome of each test case, and/or each action within a test case, to an expected outcome, and to record each test case and/or action as successful, passed, etc., or as failed, erroneous, etc. The test case execution module may be further configured to record and tabulate the outcome of each executed test cases, and to export the test execution results for viewing by, for example, the owner or operator of the application.

It should be understood that a computer system or a processor as described herein may include a conventional processing apparatus known in the art, capable of executing pre-programmed instructions stored in an associated memory, all performing in accordance with the functionality described herein. To the extent that the methods described herein are embodied in software, the resulting software can be stored in an associated memory, such as memory, and can also constitute the means for performing such methods. Such a computer system or processor may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a non-transitory computer-readable storage medium having a computer program encoded thereon for implementing the functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "communicate" and "communication" are meant to be construed broadly to encompass both wired and wireless connections and communications. As used herein, the phrases "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. It is intended that all matter contained in the above description or shown in the accompanying drawings shall be interpreted as illustrative only and not limiting. Changes in detail or structure may be made without departing from the invention as defined in the appended claims.

What is claimed is:

1. An article of manufacture storing computer-readable instructions, the computer-readable instructions comprising:
   creating a business process model of a software application, the business process model comprising representations of elements of the software application and labels for the elements of the software application, wherein the labels are used to retrieve the object properties of the elements of the software application;
   generating a plurality of test cases according to the business process model, each test case comprising respective links between one or more items of test data and the labels for the elements of the software application; and
   executing the software application, providing the test cases to the software application as inputs to thereby test the software application.

2. The article of manufacture of claim 1, wherein the computer-executable instructions further comprise connecting to the application through the Internet and executing the test cases on the system.

3. The article of manufacture of claim 1, wherein the computer-executable instructions further comprise generating one or more executable scripts, the one or more scripts comprising the plurality of test cases, further wherein executing the test cases comprises executing the one or more scripts.

4. The article of manufacture of claim 1, wherein generating a plurality of test cases comprises:
   generating first data set comprising a plurality of possible paths through the business process model; and
   generating a second data set comprising one or more actions for each element in the business process model.

5. The article of manufacture of claim 4, wherein generating a plurality of test cases further comprises combining the first data set with the second data set to yield the plurality of test cases.

6. The article of manufacture of claim 4, wherein the first data set comprises each possible path through the business process model.

7. The article of manufacture of claim 4, wherein generating a plurality of test cases further comprises generating priority and pre-conditions for each possible path through the business process model.

8. The article of manufacture of claim 7, further comprising exporting the plurality of test cases to a separate test case management tool.

9. The article of manufacture of claim 1, wherein executing the test cases comprises matching the element labels with the elements of the software application.

10. The article of manufacture of claim 9, wherein matching the element labels with the elements of the software application comprises building an xpath to enable performing one or more test actions for one or more elements of the software application.

11. The article of manufacture of claim 1, wherein the business process model is composed in business process model notation.

12. A method comprising:
    creating a business process model of a software application, the business process model comprising representations of elements of the software application and labels for the elements of the software application, wherein the labels are used to retrieve the object properties of the elements of the software application;

generating a plurality of test cases according to the business process model, each test case comprising respective links between one or more items of test data and the labels for the elements of the software application; and executing the software application, providing the test cases to the software application as inputs to thereby test the software application.

13. The method of claim 12, further comprising connecting to the application through the Internet and executing the test cases on the application.

14. The method of claim 12, further comprising generating one or more executable scripts, the one or more scripts comprising the plurality of test cases, further wherein executing the test cases comprises executing the one or more scripts.

15. The method of claim 12, wherein generating a plurality of test cases comprises:

generating first data set comprising a plurality of possible paths through the business process model; and generating a second data set comprising one or more actions for each element in the business process model.

16. An article of manufacture storing computer-readable instructions, the computer-readable instructions comprising:

creating a business process model of a software application, the business process model comprising representations of a plurality of elements of the software application and labels associated with each of those elements, wherein the labels are used to retrieve the object properties of the elements of the software application;

determining a plurality of unique paths through the business process model, each path comprising a sequence of one or more of the elements of the software application;

generating at least one test case for each of the plurality of paths through the business process model, each test case comprising a test action for each element in the path of the test case;

generating at least one computer-executable script embodying the test cases; and executing the software application, providing the test cases to the software application as inputs to thereby test the software application.

17. The article of manufacture of claim 16, wherein generating at least one test case comprises:

generating a first data set comprising the plurality of paths through the business process model; and generating a second data set comprising one or more actions for each element in the business process model.

18. The article of manufacture of claim 17, wherein generating at least one test case comprises:

storing the first data set in a first spreadsheet; and storing the second data set in a second spreadsheet.

19. The article of manufacture of claim 16, wherein the instructions further comprise:

connecting to the software application; and executing the at least one script on the software application.

20. The article of manufacture of claim 16, wherein the business process model is a first business process model, further comprising:

receiving a second business process model of the software application, the second business process model;

determining one or more differences between the first business process model and the second business process model; and generating at least one test case that accounts for said one or more differences.

* * * * *